United States Patent [19]

Robinson

US005918014A

[11] Patent Number: 5,918,014
[45] Date of Patent: Jun. 29, 1999

[54] AUTOMATED COLLABORATIVE FILTERING IN WORLD WIDE WEB ADVERTISING

[75] Inventor: Gary B. Robinson, Ellsworth, Me.

[73] Assignee: Athenium, L.L.C., Cambridge, Mass.

[21] Appl. No.: 08/774,180

[22] Filed: Dec. 26, 1996

Related U.S. Application Data

[60] Provisional application No. 60/009,286, Dec. 27, 1995, and provisional application No. 60/012,517, Feb. 29, 1996.
[51] Int. Cl.[6] .......................... G06F 15/163; G06F 17/30; G06F 15/00
[52] U.S. Cl. .......................... 395/200.49; 707/10; 706/12
[58] Field of Search .................... 707/3, 10; 395/200.47, 395/200.48, 200.49; 706/12

[56] References Cited

U.S. PATENT DOCUMENTS

| | | | |
|---|---|---|---|
| 4,870,579 | 9/1989 | Hey | 364/419 |
| 4,996,642 | 2/1991 | Hey | 364/419 |
| 5,572,643 | 11/1996 | Judson | 395/200.48 |
| 5,704,017 | 12/1997 | Heckerman et al. | 706/12 |
| 5,704,018 | 12/1997 | Heckerman et al. | 706/12 |
| 5,724,424 | 3/1998 | Gifford | 380/24 |
| 5,737,619 | 4/1998 | Judson | 707/500 |
| 5,740,252 | 4/1998 | Minor et al. | 380/49 |
| 5,754,938 | 5/1998 | Herz et al. | 62/425 |
| 5,774,170 | 6/1998 | Hite et al. | 348/9 |
| 5,790,426 | 8/1998 | Robinson | 702/179 |
| 5,790,935 | 8/1998 | Payton | 455/5.1 |
| 5,794,210 | 8/1998 | Goldhaber et al. | 705/14 |
| 5,838,790 | 11/1998 | McAuliffe et al. | 380/4 |
| 5,842,199 | 11/1998 | Miller et al. | 707/2 |
| 5,848,396 | 12/1998 | Gerace | 705/10 |
| 5,848,397 | 12/1998 | Marsh et al. | 705/14 |

OTHER PUBLICATIONS

Miller, B., "GroupLens: An Open Architecture for Collaborative Filtering," ftp://ftp.cs.umn.edu/users/bmiller/prop.ps, Univ. of Minn., pp. 1–18, Oct. 1995.

Upendra Shardanand, "Social Information Filtering for Music Recommendation" Sep. 1994, pp. 1–93, Massachusetts Institute of Technology, Thesis.

"WWW.firefly.com", web site pages, 12 pages, printed out on Jan. 21, 1998 (origination date unknown).

"WWW.amazon.com", web site pages, 15 pages, printed out on Jan. 21, 1998 (origination date unknown).

*Primary Examiner*—Zarni Maung
*Assistant Examiner*—Andrew Caldwell
*Attorney, Agent, or Firm*—Nutter, McClennen & Fish, LLP

[57] ABSTRACT

On the World Wide Web, and other interactive media, it is possible to show different ads to different people who are simultaneously viewing the same content. This invention is based on the fact that people who have shown a tendency for similar likes and dislikes in the past will show a tendency for such similarities in the future. Those people who strongly display such similarities with respect to a particular person ("the subject") are referred to as that person's "community." If the members of a subject's community tend to click on a particular Web ad, then it is likely that the subject will also tend to click on that ad. This invention combines techniques for: determining the subject's community, and determining which ads to show based on characteristics of the subject's community. The information used to determine whether a given individual should be in the subject's community is gleaned from the individual's activities in the interactive medium. Means are provided to track a consumer's activities so all the information he generates can be tied together in the database, e.g. by means of "cookies;" or by software running on the consumer's computer, such as an in-line plug-in, a screensaver working in conjunction with the Web browser, or the Web browser itself. A measure of similarity between individuals is generated. The individuals with the greatest calculated similarity become the subject's community; e.g. clusters are formed of groups of very similar consumers. Ads are presented to the subject based on his community, optionally selected based on demographics associated with the community.

25 Claims, 1 Drawing Sheet

AUTOMATED COLLABORATIVE FILTERING IN WORLD WIDE WEB ADVERTISING

CROSS REFERENCE TO RELATED APPLICATIONS

This application claims priority from U.S. Provisional Application No. 60/009,286 filed on Dec. 27, 1995 and U.S. Provisional Application No. 60/012,517 filed on Feb. 29, 1996, both having named inventor Gary B. Robinson.

FIELD OF THE INVENTION

This invention involves the display of advertising to users of an interactive communications medium. It is particularly useful with the World Wide Web, which utilizes a communications protocol on the Internet.

To access the Internet, and to carry out the methods described in this document, one must have a CPU, RAM, Internet connection (for instance, through a phone line and modem), input device such as a keyboard, and an output device such as a TV, CRT or LCD.

All of the above-identified hardware, necessary to carry out the steps described in this document, will be considered to be implied in the following description of the present invention.

INTRODUCTION

Under the old model for the advertising industry, the subject matter of one "unit of publication" (a magazine, a newspaper section, a radio show, a TV show) was often the sole means an advertiser possessed in order to guess the interests of a particular reader or viewer. If for instance, the magazine was about cars, advertisers knew that anyone reading it was highly likely to be interested in cars.

However, on the Internet's World Wide Web, multiple units of publication—that is, multiple Web pages and user actions over time—can be used to determine the interests of each individual. Moreover, this information can be gathered very inexpensively. To do this, we take advantage of the fact that a Web user's actions can be tracked over time. This rich source of information about each person will be used to bring about an era of far more efficient advertising. The information used includes not only which sites were visited by the user and for how long, but also which ads the user clicked on, as well as other information.

Under the old model, as it exists on the Web today, most of this information is ignored. It is technically possible to acquire it, but it isn't generally being done. This is due to reasons of momentum of the old model, lack of well-known software and statistical tools for making use of the information, and, not insignificantly, fears of an invasion of privacy (a problem that must be dealt with and that this concept paper will explore below). But this information, when acquired and used, will be extremely useful in trying to make sure that each square inch of the limited Web advertising space on each site is used to effectively reach individual customers.

This ignored information, because of its power to enhance advertising effectiveness, is extremely valuable.

Moreover, the use of this information benefits not only the users, but also every one of the interested commercial entities—advertisers, ad agencies, and Web sites. Each entity will be economically motivated to facilitate the move to the new paradigm.

SUMMARY OF THE INVENTION

On the World Wide Web, and other media such as interactive television, it is possible to show different ads to different people who are simultaneously viewing or interacting with the same content. For instance, a particular Web page may have an area reserved for advertisements. Anyone of average experience in the field of Web programming would be able to create code to show different advertisements to different people simultaneously viewing that page. This can be accomplished, for instance, by means of a CGI script.

Since different people have different interests, it is apparent that this can be a useful thing to do. But the question remains: how do we determine which advertisements to choose for a particular viewer?

This invention is based on the fact that people who have shown a tendency for similar interests and likes and dislikes in the past will usually continue to show a tendency for such similarities in the future. In particular, people who have shown a historical tendency to be interested in the same ads in the past will usually continue to display such a tendency as time goes on. Those people who strongly display such similarities with respect to a particular person (who we will refer to as "the subject") are referred to as that person's "community."

If the members of a particular consumer's community tend to click on a particular Web ad, then there is a certain likelihood that the subject consumer will also tend to click on that ad.

To take advantage of this fact, this invention combines techniques for solving two problems: determining the subject's community, and determining which ads to show based on characteristics of the subject's community.

In this invention, the information used to determine whether a given individual should be in the subject's community is gleaned from the activities of the individual in the interactive medium in question. For instance, when the interactive medium is the World Wide Web, the information may involve such facts as the choices of Web sites the individuals have each visited, the frequency of such visits, the nature of the content at those sites, etc. If the sites are online stores, the information may involve the choice of specific items purchased, as well as the prices of those items. As another example, if the site is an entertainment recommendation service based on user-supplied ratings (Firefly at www.ffly.com is an example), the ratings can be used. One more example is the selection of Web ads each individual has chosen to click on. In one embodiment, there is a feature which allows individuals to indicate their disinterest in an ad; this serves as additional input.

There needs to be a means to track a consumer's activities so all the information he generates can be tied together in the database. In one embodiment, this is accomplished by means of Netscape-style "cookies," which are stored on the consumer's hard disk under CGI control. In other embodiments, software running on the consumer's computer, such as an Netscape-style in-line plug-in, a screensaver working in conjunction with the Web browser, or the Web browser itself, is used to tie the data together.

This information is used as the basis for calculations which generate a (usually numeric) measure of similarity between individuals. Examples of such similarity measures are well-known to programmers of ordinary skill in the field of collaborative filtering.

The individuals with the greatest calculated similarity become the subject's community.

In one embodiment clusters are formed of groups of very similar consumers. Then, the subjects community consists of all or some of the other members of his cluster.

The next major task is to decide what ads to show the subject based on his community.

In one embodiment of the invention, a new ad is displayed randomly or on a fixed schedule to a certain number of users. During this "training period" for the new ad, a certain percentage of the members of the subject's community will click on it. If this is an unusually high proportion, then there is a relatively high likelihood that the ad will be of relatively high interest to the subject. In one embodiment, statistical techniques are used to determine a probability, associated with a fixed confidence level, with which we can assume a randomly-chosen member of the subject's community will tend to click on the ad; this probability is used as the measure of similarity. Other embodiments involve other analytic techniques.

There are a number of additional features found in other embodiments of the invention.

In one embodiment, the advertiser specifies the demographic profile he wants to show the ad to. In that case, as long as we have demographic information available for some consumers, the system targets ads by considering the subject's community members who have supplied demographic information. For instance, by computing the average age of the members of the subject's community who have supplied their ages, the system is enabled to make an "intelligent guess" about the subject's age, and use that guess for the purpose of targeting ads.

In one embodiment of the invention, special Web pages or sites are supplied which enable advertisers to specify specific specific sites they would like their ads to run on (or not run on); similarly, special Web pages or sites are supplied which enable Web site administrators to specify ads they would like to display or not display.

In other embodiments, means are supplied for consumers to specify and update their demographic information; these means take the form of a Web site or page in one embodiment, and software running on the consumer's computer in another.

In some embodiments, software running on the consumer's computer makes the choices about which ads are to be displayed for that user. This embodiment has the advantage that it obviates the need for a central database storing detailed information about consumer together with an identifier for each consumer; so the consumer's privacy is protected.

BRIEF DESCRIPTION OF THE DRAWINGS

A more complete understanding of the present invention and the attendant advantages and features thereof will be more readily understood by reference to the following detailed description when considered in conjunction with the accompanying drawings wherein.

DETAILED DESCRIPTION

Figure 1:
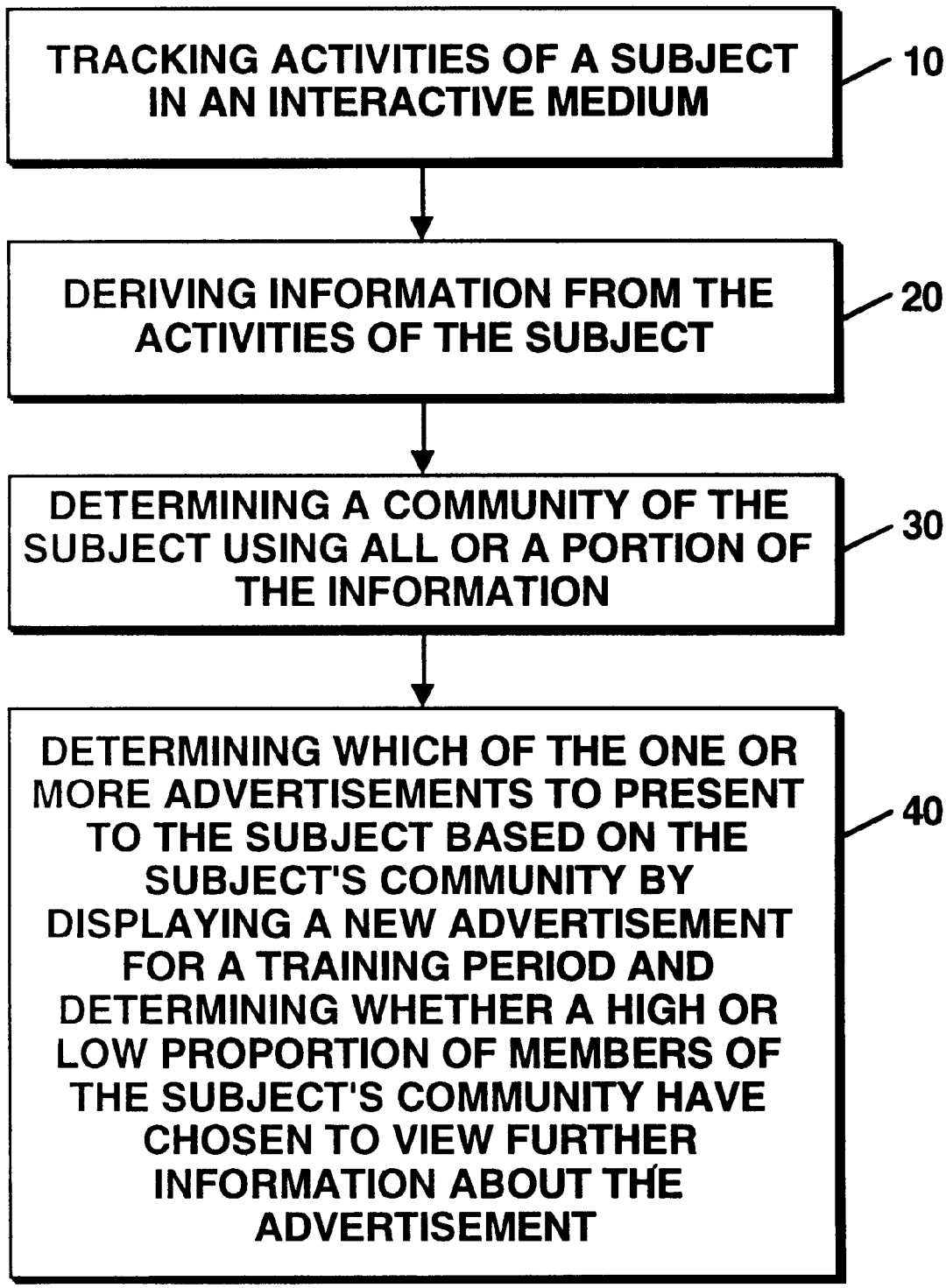
FIG. 1 is a flowchart diagram for the steps performed in selectively displaying one or more advertisements to a subject in accordance with the teachings of the present invention.

Referring to FIG. 1, a preferred embodiment of the present invention is shown. In this embodiment, the system begins by tracking activities of the subject in the interactive medium (step 10). Next, the system derives information from the activities of the subject (step 20). The system then determines a community of the subject using all or a portion of the information (step 30). Finally, the system determines which of the one or more advertisements to present to the subject based on the subject's community by displaying a new advertisement for a training period and determining whether a high or low proportion of members of the subject's community have chosen to view further information about the advertisement (step 40).

Smart Ad Boxes

The centerpiece of this invention is the "Smart Ad Box." A Smart Ad Box is an area on a Web page (usually rectangular) which is used to display Web advertising. Special software algorithms are used to determine which ads are shown to which users; different visitors to a Web page can simultaneously see different ads.

A number of factors can be used by the software in determining which ads to show. For instance, based on their Dec. 6, 1995 press release, the company C|Net appears to be planning to implement a Smart Ad Box-like system which decides which ads to present to which users based on such information as the type of Web browser they're using, their age, gender, Internet domain (EDU, COM, etc.) and other demographic information. A Dec. 19, 1995 press release from Novo Media Group indicates at least somewhat similar plans.

This invention involves using automated collaborative filtering (ACF) either instead of, or in addition to, the above-mentioned techniques. (ACF is also referred to as social information filtering.) As far as is known, there is no prior art that involves using ACF in determining which ads to show to whom.

For ease of discussion, this patent will focus exclusively on the use of ACF in Web advertising. However, it must be stressed that ACF can be used in a complementary manner to techniques such as those C|Net and Novo Media Group are developing. ACF can give us a certain amount of evidence that a particular ad should be shown to a particular user; such information as age, sex, Internet domain, etc. can be considered as well.

From the point of view of a Web site hosting a Smart Ad Box, the Smart Ad Box consists of a small amount of HTML code. It may optionally involve non-HTML code, such as Java. It involves calling a CGI routine.

What the user sees.

When a Smart Ad Box appears on a page, a user viewing that page will see an ad which is targeted to that particular user. Thus, simultaneous viewers of the same page will often be presented with different ads. The ad is visually contained in the Smart Ad Box. The Smart Ad Box may or may not be rectangular in shape; it will often, but not necessarily, exist in a fixed region on the screen.

The Smart Ad Box will present different ads to a user over time. Certainly, simply showing the same ad over and over again is not maximally effective. The user would simply become used to it and would therefore come to ignore it. This invention involves rotating the user through different ads which are of likely to be of interest to that particular user. The rotation schedule can be chosen for maximal overall advertising effectiveness. One way to measure effectiveness would be the frequency of clicks on ads in Smart Ad Boxes—the rotation schedule could be chosen to maximize this number. It could involve such information as the number of times the user has seen each ad in the past, and the predicted likelihood that the user will be interested in the given ad. Another factor that could be considered is resonance with the Web page showing the ad—perhaps ads that relate in some way to the subject matter of the page will be more likely to be clicked on.

Like most current Web advertisements, clicking on a Smart Ad Box will cause the user to be transported to a Web site chosen by the advertiser.

Moreover, particular implementations of the present invention can optionally include certain additional features, such as the ability to reject an ad—for instance, with an option-click of the mouse. A user would do this for an ad that had no interest for him. The rejected ad would automatically be replaced with another ad targeted to that user.

Control features for advertisers and Web site managers.

The central database can optionally contain rules or control records provided by advertisers and Web site managers. These could be used for the following purposes:

An advertiser may not want to be associated with certain Web sites or types of Web sites; alternatively there may be certain sites or types of sites they would like to be associated with as strongly as possible. Advertisers could specify such inclinations, and they can be stored in a database. Then, when the software is choosing the next ad to show to a particular user who is visiting a particular Web site, those factors can be taken into account.

Similarly, a Web site may prefer certain advertisers or advertisements or types of advertisements to others. The Web site can specify such inclinations, and they can be taken into account when the next ad is chosen for a particular user currently visiting that Web site.

One way for advertisers and Web sites to supply these rules would be for a Web site to be constructed which would do the following:

1. There would be a page which would present advertisers with a list of Web sites which are currently running Smart Ad Boxes. (Optionally, these Web sites could be grouped according to subject matter. For instance, Web sites concerning automobiles could be grouped together. In addition, individual pages of Web sites could be listed. Thus, there could be a three-level hierarchy.)

2. It would allow the advertiser to input identification information about an ad—for instance, its URL. This will tell the software that the information given will apply to that particular ad.

3. It would allow the advertiser to indicate which Web sites he would like to have display his ad. If Web sites are grouped by subject matter and/or individual pages are listed, the advertiser should be able to indicate choices on those items, too.

For instance, a check box could appear next to each item. If the advertiser clicks a checkbox for an item which has subordinate items (for instance, the user may have clicked on the checkbox for a Web site which was listed with its individual pages) then the checkboxes for the subordinate items could be automatically "checked" or "filled in" by the software. (Java or JavaScript could be used to do this in "real-time" instead of requiring the user to submit the form.) But a number of other mechanisms could be used instead of checkboxes—for instance, the listings could change color to indicate having been chosen. Checkboxes are probably preferable, though, since their meaning is so intuitively clear.

4. Optionally, there could be a page that would work the opposite way. It would allow an advertiser to identify a particular ad, and then it would allow him to specify the sites (subject groups, pages) which have Smart Ad Boxes but which he would rather not allow to show his ad. Thus, his ad would be distributed to all pages with Smart Ad Boxes except those that were specified. Again, pages could be specified by means of checkboxes at page, site, or subject matter levels.

5. In the above, whenever a page is listed, it should optionally be possible to click on the listing to be transported to that page in order to investigate it.

6. Optionally, advertisers should be able to retrieve the information already entered for a particular ad. For instance, an advertiser may change his mind about showing an ad on a given site. So, by specifying the ad's identifier, the advertiser should be presented with a listing of pages which indicate the choices he has already made; ideally, he should be able to change those choices using the same techniques used to enter those choices originally—for instance, by clicking on the checkboxes.

7. Through the pages described above, an advertiser would be able to specify the pages which will be allowed to display the ad. However, the Web sites with Smart Ad Boxes also need to have a choice. So a page could be set up for them which listed all the ads which they are allowed to show. As in the other case, checkboxes could be used to indicate which ads will be chosen; again as in the other case, the webmaster should be able to indicate either the specific ads he wants to present on his page (automatically disallowing the rest) or the ads he doesn't want to present (automatically including the rest).

8. As in the other case, allowed ads could be presented hierarchically by subject matter, with checkboxes at both levels.

9. The ad listings could, optionally, consist of the ad banners themselves. Alternatively, they could be "hot-linked" text that the webmaster could click on to be transported to a page containing the banner (which might additionally have other information supplied by the advertiser about the ad). There should optionally also be a way for the webmaster to visit the site that the banner will be linked to; this could be accomplished simply by hotlinking the banner to the site, just as will be the case for users. It could also be accomplished other ways, including having a button, next to the listing for the ad, which is hotlinked to the related site.

10. Alternatively, the system could work the opposite way. Instead of enabling advertisers to offer ads to chosen Web sites, the process could start with Web sites offering pages to advertisers, which could then choose which pages they want to accept.

11. In cases where hierarchies are displayed, the hierarchies could be collapsible, similar to the way files are listed in the Finder of Macintosh's System 7 operating system when View is "by Name." This would enable people using the lists to navigate them more effectively, especially if the actions for expanding and collapsing hierarchy levels were very fast. To achieve a quick and responsive user interface, a Java applet could be written which handled some or all aspects of the user interaction.

Control features for users.

Demographic data.

Web pages can optionally display a hot link to a site where users can enter their demographic data. Users can optionally be given the ability to modify their demographic data at any time. Finally, if they wish to, they can optionally be given the ability to delete their demographic data at any time.

This control over their demographic data will alleviate many user's privacy concerns.

In addition, users should have easy access to information stating how the demographic data is used, and who has access to it.

It will probably be the case that some users will have less concern about privacy issues than others. The Web site that allows users to update or delete their demographic data could optionally also allow users to specify a chosen level of privacy. For instance, some users might wish to allow companies to have access to their demographic data in order to receive certain special offers (which could be made by direct mail, email, or other means). Optionally, there could be list where users could choose companies which will be allowed to have access to their information. For instance, a check box could appear next to each company name. As described in the section of this document which discusses the means by which Web sites would choose advertisers, users could choose companies by means of a hierarchically-organized list, grouped by product category. Again, the hierarchies could be collapsible in order to increase ease of navigation. Of course, the companies could alternatively by listed in some other manner, such as alphabetical order.

Users can be induced to supply such data by special offers such as discounts on selected merchandise.

Tracking Data.

Users can optionally be given the ability to tell the system not to store their tracking data. (If the user elected not to be tracked, the system would have to decide what ads to display based on other means, such as domain type [EDU, NET, etc.], browser and computer types, demographic data that had been obtained, etc.)

Storing data on user's machine instead of in a central database.

As still another option, it would be possible to store the tracking data only on the user's own machine, so that the data would be completely private̅it would never have to be compiled on another machine.

This means that the criteria normally used by the system to decide which ads the user will see and the order these ads will be displayed in will have to be sent, across the Internet, into the user's computer; decisions about the ads will be made there.

Let's refer to a user who has elected to store his tracking data locally as Sam.

For instance, to make use of ACF (discussed elsewhere in this document), the tracked history of various users (or some subset of that information) will have to be accessed by (in other words, sent to) Sam's computer. (This data would, of course, be sent without any identifying information that would enable the sender to learn what individual was associated with what tracking data.) Software running on Sam's system could then decide which of these users are most similar to Sam, and make subsequent decisions about which ads to display for Sam.

To make the process of sending other user's tracking data to Sam more efficient, the system could optionally be designed so that similar users were grouped into statistical clusters; all the people in one cluster would be more similar to each other than to people in any other cluster.

Then, information describing the clusters could be sent to Sam's machine, which could decide which cluster Sam was in. A variety of different types of information could be sent to Sam's machine describing each cluster. For instance, the average amount of time spent on each tracked Web site, where that number is computed from the data corresponding to all users in the cluster, would be a good candidate. For each cluster, this number could be sent for every tracked page (or for only a subset of the tracked pages, which could be chosen, for instance, for their statistical significance). Then, software running on Sam's machine could determine how closely each cluster matches Sam's activities; Sam would be considered to be in the cluster he matches most closely.

Alternatively, instead of sending information about each user or cluster into Sam's computer, information could be sent about the demographics which apply to each ad. These demographics could be supplied to the system by the advertiser or ad agency, or could be determined by a central computer by means of ACF as described elsewhere in this document.

Since Sam's information would only be stored in his own computer, he would not have as many privacy concerns with regard to inputing demographic information. So there is a good likelihood that he would be willing to supply such information. If he did so, the system could optionally not store his tracking information.

So, to determine which ads to display for each user and with what frequency and when, the software running on Sam's system could simply see how closely each ad matches his demographic data.

Optionally, every time Sam clicks on an ad, his demographic information could be sent to a central database, where it would be used to analyze the overall demographics of people who click on the ad. However, no identifying information for Sam need be sent or stored.

The technique of storing all tracking data on Sam's machine could be implemented, using technology available at the end of 1995, with Netscape's protocol for Inline Plug-Ins. Inline Plug-Ins, unlike Java applets, have the ability to write directly to the user's hard disk. (The situation for Java applets may change in the future, and other technologies may emerge that can accomplish the same purposes.) This ability is essential for storing the user's data.

The Inline Plug-In could, if desired, handle all functionality of displaying the ad, determining what ad to show, and reading and writing the relevant information from and to the hard disk. Otherwise, this functionality could be divided the between the Inline Plug-In and other software, such as Java applets.

A separate application could be written, which the user could download, to manage his demographic information on his hard disk. This program could contain the user interface that would enable him to easily update the information.

Security note:

No matter which of these methods is used, the cookie mechanism provides a very high level of security. A user's randomly generated cookie is stored on the user's machine; and that is the one and only way information stored on a central database is associated with that user. The cookie mechanism is such that only programs with the same domain name as the one that created the cookie can read or modify it. So while the system's central server machine can track a user by means of the cookie, a program existing under a different domain name will not be able to access the cookie at all.

Moreover, there is no need to store user-identification information such as email addresses (or phone numbers or postal addresses, etc., etc.) on the central system. So there is no way the company running the system will have the ability to do anything to intrude on the user's privacy. For instance, there would be no way that the tracking or demographic information could be sold as the basis of a mailing list (email or otherwise). The fact that such identifying information does not need to be stored in the database is a key feature of this invention.

Tracking users.

There are a number of possible ways to track users. Some will be presented here:

1. Tracking by means of code on participating Web sites.

Each Web page which contains a Smart Ad Box will contain code, which may be comprised of HTML, Java, or other languages, which will allow a user to be tracked. (This code may work in conjunction with other software, such as Netscape-style Inline Plug-Ins.) In addition, such means for tracking a user can be embedded in pages that do not themselves display advertising. Pages which have the ability to cause a central database to be updated with tracking information will be referred to in this document as "tracking-enabled."

Every time a user visits a tracking-enabled page, a central database will be updated to show that that particular user visited that page. Optionally, the length of time spent on the page, or other such information, can also be stored.

One way to perform this update will be for the page to reference a CGI script which exists on the machine containing the central database. This CGI script, which can be written in languages such as Perl, C, Basic, AppleScript, etc. would perform the database updates.

Alternatively, a CGI script can exist on the machine which is hosting the page. To perform updates, it would communicate over the Internet with a program which exists on the machine hosting the database.

Some types of information that an embodiment of this invention could choose to store for each user:

An identifier of the page the user visited.

The length of time spent on the page.

The amount of money spent by the user while visiting the page (or site)—this would be useful for Web sites that are retail stores.

The identifier of the ad displayed for the user in the smart ad box.

Whether or not the user clicked on the ad.

Whether or not the user rejected the ad (mentioned in an earlier section of this document).

An identifier of each particular item purchased—for instance, the ISBN of a book.

There has to be a mechanism for re-identifying a user from session to session.

The preferred embodiment involves using the Netscape Navigator's cookie mechanism. This will allow us to accurately track the 70% to 80% of Web users who use the Netscape product. In addition, it will work with any Web browser that has a cookie mechanism compatible with Netscape's. It is likely that the vast majority of Web browsers will, in time, have such compatibility. The preferred way to use it is as follows:

Each time the user references a tracking-enabled page, a CGI script is executed. This CGI script, referred to in this document as the Tracking Script, is referenced by each tracking-enabled page; that is, all tracking-enabled pages, which may be spread out over many different host machines, will all call the same Tracking Script which exists on just one machine or networked group of machines accessible through the one URL. (It is necessary for the Tracking Script to exist under just one domain tail in order to receive the cookie no matter which page the user is on. A CGI on a machine with a different domain tail will have no way to access the cookie.) A domain tail consists of the "tail end" of the domain name such that the included portion contains at least 2 or 3 periods, depending on the particular top-level domain. For more on this, see Netscape's technical note on the Web at http://www.netscape.com/newsref/std/cookie_spec.html or any other documentation on Netscape's cookie mechanism, which is a public protocol that any competent practitioner is familiar with.

Alternatively, a set of Tracking Scripts could be made available, all under the same domain tail, such that a particular participating Web site could interact with one of these routines. For instance, there might be different properties associated with the different Tracking Scripts—for instance, in cases where the Tracking Scripts also draw the Smart Ad Boxes, different Tracking Scripts might draw Smart Ad Boxes of different sizes. Again, it is essential that all of these Tracking Scripts be under the same domain tail in order that they can all access the cookie.

The Tracking Script will examine the cookies passed to it to see whether one of them is the Tracking Cookie.

If it did receive the Tracking Cookie:

then this cookie will contain the identifier of the user; the central database can then be updated with the ID of the user and of the current page, and, optionally, other information such as the time spent on the page.

Optionally, the expiration date of the Tracking Cookie could be updated; for instance, it could always be set to one year after the last Tracking Cookie access.

If it did not receive the Tracking Cookie:

then it creates it. The value of the Tracking Cookie could be generated using a random number generator; one of many other alternatives would simply be to pick a number one greater than the last value generated.

The Tracking Cookie is then stored on the user's machine using the Netscape cookie mechanism; each time from then on that a user visits a tracking-enabled page, the stored Tracking Cookie will be used to re-identify that user. The Tracking Cookie should be assigned an expiration date so that it doesn't disappear when the user leaves. The expiration date could be, for instance, one year in the future.

Note that the Tracking Cookie will not allow anyone to intrude on the user's privacy by sending him email or by any other means. There need be no way to associate the Tracking Cookie with the user's name, physical location, or any other personally-identifying information.

The techniques involved in writing these CGI's are known to any competent practitioner of Netscape-related CGI programming.

There are other ways to track users, such as using environment variables such as REMOTE_ADDR, REMOTE_HOST, REMOTE_IDENT and the header field HTTP_FROM. These are known to any competent practitioner of CGI programming. Moreover, other methods will probably become practical in time. So the cookie mechanism is not required, but does have advantages.

2. Tracking by means of software that runs on the user's machine whenever he is browsing the Web.

The problem with tracking by means of code on participating Web sites is that it only enables users to be tracked while they are visiting participating sites. So the amount of information that can be gathered is limited in that way.

It would be much better to be able to track all sites visited by a user.

The challenge is to get the code that does this tracking into the user's machine. Users don't want to manually download software unless they clearly understand that there is a fundamental benefit in it for them.

It might be thought that a Java applet would be the perfect means to track user activity over time. But current implementations of Java automatically flush Java applets from the cache whenever the user moves to a domain other than the one the Java applet originally came from. So Java currently has limited usefulness for this purpose.

Alternatives:

Building tracking code into the Web browser itself.

Probably the ideal methodology would be to build the tracking code into the Web browser itself. In fact, Web browsers do already have some tracking code built-in; for instance, the Netscape Navigator has a "Go" menu which lists sites previously visited in the current session. This information is lost, however, when the user Quits Netscape Navigator.

A Web browser could automatically open up a socket for communications with the central database. At intervals, it could send tracking information to the central database without any participation on the part of the user. This information could include, for example, the URL of each page visited and the amount of time spent there.

The only real drawback to this technique is that it requires the participation of the companies which create the browser software.

Tracking the user by means of software running on the user's machine simultaneously with the browser, using software that has no user interface (or a minimal user interface).

The user could download an application or other type of software (such as a Macintosh-style control panel or system extension) which could track his activities and communicate them to the central database.

This software could operate with the cooperation of the Web browser. For instance, the Netscape Navigator allows user activities to be communicated to separate applications; on the Macintosh, this mechanism is based on Apple Events.

To motivate the user to download this software, an incentive could be given. For instance, the user could be offered a great deal on an advertised product or promised a number of such great deals in the future. In fact, users could even be paid to download the software.

Tracking the user by means of software running on the user's machine which is of its own benefit to the user, separate from its tracking functionality.

It would be best if users could be motivated to download the tracking software without being offered special deals or financial rewards. For this to be the case, the software has to provide some benefit of its own.

One example of this would be a screensaver. Screensavers typically run all the time, although they only take over the screen when the user is inactive.

A screensaver that had some desirable properties compared to other screensavers available in the marketplace, and that was inexpensive or free of charge, would be likely to be downloaded from the Web by quite a few users.

One way that such a screensaver could differentiate itself from other current screensaver products is by means of its ability to communicate over the Internet, which is required for its tracking functions.

For instance, this screensaver could be designed so that it could display HTML and/or execute Java code. In fact, it could have much of the functionality of a Web browser. (Or, it could use its own protocols for displaying images and text on the screen, different from those used in Web browsers. However, it would probably be best for it to use standard protocols.)

Thus, companies and individuals could provide content for this "Internet Screensaver." Users could choose the URL they want to be connected to, for instance, by means of a menu that was automatically updated to show all URL's which supply Internet Screensaver content. Alternatively, the list of URL's could be in the form of HTML or Java output displayed on a screensaver page. Or a dialog box could be used, etc. (The list of such URL's could be communicated from a central site across the Internet.)

An example of content that would motivate many users to download the Internet Screensaver would be a continuously updated stock ticker. A couple of other examples would be continuously updated news headlines or weather reports. A further example might be showing the status of the user's email box.

Continuously updated content would only be possible for users with continuous Internet connections. That situation currently is common in office situations, but not in home situations. Of course, it is quite possible that that situation will be changing in the future. For instance, cable companies may in the relatively near future offer continuous Internet connections at an inexpensive price.

For users without continuous Internet connections, however, semi-continuous content could be made available. For instance, the software could enable an Internet connection for a brief period in every hour (or other interval) during which news headlines, weather, stock prices, or other information could be downloaded and displayed during periods of user inactivity during the intervening hour.

Alternatively, the Internet screensaver could simply wait for the user to log on to the Internet, and download content at that time to be used as content until the next user-initiated Internet connection. Again, the content could include news stories, etc.; it could also include less timely content such as comic strips.

Additionally, the Internet Screensaver could interact with the operating system of the user's computer to perform other functions.

For instance, it could periodically retrieve the exact time from a clock residing on the Internet, and then use that information to set the clock in the user's computer. (For instance, as of Dec. 26, 1995, the current time according to the US Naval Observatory is available on the World Wide Web at http://tycho.usno.navy.mil/cgi-bin/timer.pl) Based on comparing the true time to the computer's internal clock, a "drift" factor could be computed. The screensaver could then update the clock at regular intervals to compensate for expected drift; it could do this between access to the true time over the Internet.

(Note: the Internet screensaver would have commercial value even without its relationship to the advertising paradigm discussed in this paper, if, for instance, the user-tracking capabilities were to be omitted. For instance, many Web sites would benefit from publicizing themselves by means of providing content to the Internet Screensaver.)

(Additional note: the Internet Screensaver does not necessarily have to be a separate piece of software from a Web browser. A Web browser could itself be a screensaver, through the addition of screensaver-related capabilities such as the ability to sense user inactivity, the ability to bring itself into the foreground when user inactivity is sensed, and the ability to completely take over the screen so that only the desired screensaver content is visable [usual menus, etc. would be hidden]. Screensaver content is usually, but not exclusively, a dark screen containing moving images. Such a Web browser could use its regular graphics abilities to display screensaver content in the form of HTML, Java, JavaScript, or other protocols.)

Using bookmark files already stored on disk by popular Web browsers.

Bookmark files contain a form of tracking information. They list the sites the user visited and liked enough to want to be able to easily visit again. Also, Netscape's bookmarks file, for instance, contains the dates that the user created the bookmark for each site as well as the date the user last visited the site. These could be used to make inferences about how useful the user finds the site—for instance, if he bookmarked a site a long time ago and visited it very recently, it's fairly likely that it's one of his more frequently-accessed sites.

The WebHound Web site (now called WebHunter) which was produced by the MIT Media Lab does, in fact, use bookmark files to facilitate recommendation of Web sites by means of automated collaborative filtering.

The problem with this technique is that there is currently no automated way that a Web site can acquire the content of a user's bookmark file.

A Java applet would be a candidate, except that security restrictions currently prohibit Java from reading files on the user's hard disk. Lifting this restriction in the case of bookmark files would solve this problem.

Another way to track users is the following:

Code can be provided to a number of Web sites that enable them all to access the same central database when a user logs in, enabling the user to use the same user ID and password on many different Web sites and potentially freeing each Web site from the need to have a database for checking whether each user had already registered. This code can update a central database to show which participating sites have been accessed by each user.

Ease of implementation.

It would be valuable for embodiments of this invention to make it very easy for Web sites to participate.

To do this, a Web site (or, perhaps, a page or set of pages) should be made available that contains complete instructions on how to set up a participating page. Instructions should explain how to place a Smart Ad Box on a page, as well as how to enable the tracking of users on a page (if the embodiment involves separate code for tracking and for the Smart Ad Box).

The code could be designed in such a way that there need be no direct communication between the people supplying the Smart Ad Box service and related services and the people who want to enable their Web site to participate in those services. Any competent practitioner could design such code. Furthermore, it should be designed in such a way that the modifications required to enable a Web page to participate are minimal. Again, any competent practitioner could design such code.

Thus, an instructional site would enable participation in the service to grow rapidly. Web sites could very easily become participants on a trial basis.

It is an important consequence of this invention that relatively small Web sites (small in the sense of a relatively small number of daily visitors) will be able to become participants. Because no human involvement is required on the part of the company supplying the Smart Ad Box and related services, there is much less of a barrier to the involvement of these small sites in advertising. Normally, the manpower associated with making agreements between individual advertisers and ad agencies and individual Web sites is prohibitive enough that no such agreements are made with small sites. Thus, this invention will enable many small sites to earn money from displaying advertising. The largest expense involved in dealing with an individual participating Web site might be the expensive of writing and mailing a check; of course, Internet banking may soon lower that cost.

Optionally, the Web site discussed in this section (or a separate site) could allow participating Web sites to determine the amount of money they have earned to date by virtue of their participation. (It is expected that advertisers will pay the company offering Smart Ad Box and related services, and that this company will pay the participating Web sites.)

For instance, each participating site could have an identifying code and/or password which they acquire through interaction with the instructional Web site or some other Web site. The participating sites themselves could choose their ID codes and/or passwords, or they could be assigned by the software.

(It is possible that this same ID code could be "hard-coded," or directly incorporated, into the code on a participating Web page which calls the Smart Ad Box CGI in order to identify the site. The instructional site would, of course, explain how to do this.)

In an embodiment where advertisers have ID codes and/or passwords, they should be able to go to a particular page and type in that information, and, in return, be enabled to see the amount of money they have earned to date.

(Alternatively, instead of using ID codes and passwords, an embodiment could identify companies by other means, such as checking a cookie on the client machine or simply allowing companies to type in the company name.)

Moreover, in the one embodiment, Web sites who would like to become paid participants would be able to accomplish everything needed online, without manual intervention. This would save considerable money, and make it even more practical to allow small Web sites to participate.

In other words, there would be a Web page with (possibly among others) the following attributes:

Prospective participants could input (or receive a generated) ID code and a password. Of course, the system would check to make sure that this ID code was not already in use by some other company.

Prospective participants could input whatever information is required for payment; for instance, if physical checks are to be sent through the mail, this information would include the address and the name to make the check out to.

Then, based on the above information, the system could automatically cause payment to be made. Checks could be printed, or funds transmitted by electronic means, all with no (or minimal) human intervention.

In order to keep expenses down, the system could optionally be programmed not to send a payment until the money owed to the participating sound exceeded some preset amount. This way, the expense of sending the payment will only be a small percentage of the funds involved.

It must be stressed that there are other ways of enabling customers to input the information discussed in this section. For instance, multiple Web pages could be involved in the input process, or, as just one more example, if the embodiment in question involved telephone communications, part or all of the input process could occur by means of pressing the keys on a touch-tone telephone. (Of course, Web page input is based on hardware such as a video screen, keyboard, random access memory, etc. The techniques described here are a method for enabling this hardware to achieve the desired ends.)

It should also be noted that the techniques described in this section are also useful for advertising systems that do not involve automated collaborative filtering; as one example, consider a system that simply uses demographic information supplied by the individual users in order to decide which ads to display to whom. Such a system could use the techniques described here to enable Web sites to participate without human intervention, again leading to the cost savings which would make it very practical to allow very small Web sites to participate.

It is of significant value to enable these small Web sites to participate, because a large amount of the time of many who use the Web is spent visiting such small sites. Making that space available for advertising adds significantly to the potential revenue stream.

Automated Collaborative Filtering

ACF is a field of research which has been receiving attention in recent years from such organizations as BellCore and the MIT Media Lab. I myself devoted 18 months over the last few years to research in this area. An MIT Media Lab spinoff company called Agents, Inc. has a Web site which uses this technology for making personalized recommendations of music CD's. Upendra Shardanand's 1994 Massachusetts Institute of Technology (MIT) Media Lab Master's Degree thesis, entitled *Social Information Filtering For Music Recommendation* (hereby incorporated by reference) is a good write-up of their basic technology.

The basic idea, as applied to Smart Ad Boxes, is as follows.

Suppose we want to decide whether a particular ad is likely to be of interest to a particular user, say, Joe. We want to use automated collaborative filtering; we may be using this technique in addition to other methods for matchings ads to users.

First, we need to decide which other users are similar to Joe in their interests. A list of similar users can be stored in the database, or can be generated "on the fly." Ideally, we would also compute a number representing the degree of likely similarity of interests. In fact, the list of similar people can be based on this number: for example, the most similar person to Joe is at the top of the list, and each successive entry displays less similarity until some cutoff point is reached, beyond which people aren't added to the list.

To compute these degrees of similarity, we need data. This data will involve the information we have stored in our database by tracking each user over time. (Optionally, it could also involve other information such as demographic data supplied by the user; but by not relying on such data, we eliminate the need for the user to actively participate in this process in any way.)

From our database, the system "knows" which Web sites Joe has visited, and, possibly, how often he has visited each one, the amount of time spent at each one, which ads he clicked on or rejected, and/or other information. We will have collected similar information with respect to other users.

In order to compute a degree of similarity of interests between Joe and a particular user, we compare the stored tracking information. In some cases, Joe and the other user will have visited none or very few of the same sites. In other cases, the tracking information will show that they are remarkably similar in the sites they've chosen to visit; this would be indicative of a high degree of similarity of interests.

Certain mathematical and statistical techniques can be used to compute a number which represents the amount of likely similarity of interests in a meaningful way, based on such profiles. Such techniques are described in the Shardanand thesis, John Hey's U.S. Pat. Nos. 4,870,579 and 4,996,642 (hereby incorporated by reference). While these techniques are usually described as being useful for deciding which pairs of people tend towards the most similar esthetic judgments, the techniques apply equally well to their basic interests in life, as manifested in, for instance, the types of Web sites they choose to visit and the types of ads the click on.

Now, let's assume that we have a list of the users who are most likely to be similar to Joe in their interests, and, optionally, that we have a number corresponding to each other user and describing the degree of similarity between him and Joe.

There are a number of ways we can use this list of similar users; some of which are described below.

If the current embodiment is one in which users can (perhaps optionally) provide demographic information, then some users who are similar to Joe will, most likely, have supplied such information. Since they have similar interests to Joe, there is a probability that their demographic backgrounds will also be similar to Joe's.

The software can therefore make intelligent guesses about Joe's demographic data. For instance, with regard to age, the software can compute the average age of the people close to Joe who have supplied us with their ages. The same idea holds for income level. The software can guess items such as sex by extrapolating from the most common sex of people with similar interests to Joe. Similarly, the software can make intelligent guesses about other categories of demographic data. The specific technique used to make the extrapolation isn't the concern here. The point is that an extrapolation can easily be made.

Thus, if the advertiser has given information which is stored in the system about what the target audience for an ad is, then the software can check to see which ads are most highly targeted for Joe. However, even if the advertiser hasn't given that information, the software can examine the data to see which demographic groups have showed the most interest in each ad—so the system can supply this information if the advertiser doesn't.

One interesting aspect of this technique occurs if Joe's interests are atypical for his demographic group. For instance, some people in their 50's have interests that are more common for people in their 30's. Thus, the technique described here may incorrectly come to the conclusion that Joe is in his 30's when he's really in his 50's—but that erroneous conclusion would actually lead, in this case, to a better targeting of advertisements. If Joe's interests are closer to those of a person in his 30's, then ads directed to that age group are the ads that are most likely to be of interest to him.

Of course, this also applies to users who have supplied some, but not all, of any requested demographic data. This should not be construed to mean that my invention ONLY involves making extrapolation about demographics by means of such ACF techniques as were explicitly mentioned in the documents, such as John Hey's and the MIT Media Lab's (Shardanand's). It also includes making extrapolations based on other versions of ACF, some of which may have very different degrees of sophistication from the mentioned ones.

Whether or not the users supply demographics, there are a number of possible "pure ACF" approaches, some, but not all, of which will be discussed here.

○ One approach:

For every ad, we can consider the list of people who are similar to Joe, and compute the ratio of clicks to impressions. For example, if there were a total of 1000 impressions, and 10 people clicked on the ad, the ratio would be 10/1000 or 1/100. (An impression is one showing of an ad to a person.)

This ratio provides a very rough measure of the interest of people on the list in the ad. The greater the ratio, the more interest is indicated.

Therefore, the ad with the highest ratio would be considered to be the one most likely to be of interest to Joe; the ad with the second highest ratio would be the one second most likely to be of interest; etc.

These ratios could thus determine the frequency with which the system chooses to show Joe the various ads.

○ Another approach:

For each person on the list of people similar to Joe, we see how many impressions of a particular ad were required before he clicked on it. We assume that that number is related to the probability he had of clicking on an ad during a given impression. For instance, if he had 10 impressions before clicking on the ad, we might assume that P=1/10. If he never clicked on the ad, we would assume P=0.

So, for each user, and for each ad, we will have a value for P. If we average these values together for each ad, we'll have an average P for that ad, and can use that to determine which ads are more likely to be of interest to Joe.

Now, we showed earlier that it is possible to compute a numerical measure of closeness to Joe. These measures could be used as weights. Instead of doing a simple average, we can take the weighted average of all the users, where the weights are determined by each user's closeness to Joe.

One could use the closeness measures directly as weights. Alternatively, they could be transformed. Shardanand's thesis gives some methods for transforming similarities to weights that have proven to be effective.

Genetic programing could be used to evolve algorithms to transform the similarities to weights. The fitness function would be the algorithm's success in predicting which ads are of interest to Joe. For purposes of the genetic programming process, the fitness function would measure how good a particular algorithm is at "predicting" how interested Joe was in ads that he has already been exposed to, and where we have already counted how many impressions it took him to click on them.

Other methods for determining weights can be generated by trial and error or by other means.

A more statistically sophisticated approach:

Again, we only consider the people who are similar to Joe in taste.

We will again compute the ratio of clicks to impressions. Call it R.

For each ad, there is a probability P that people as similar in taste to Joe as those on the list will click on it in a given exposure.

P, not R, is the number we're really interested in. R is just a rough estimate of P. The reason for this is that we only have a limited amount of data available to us; if we had an unlimited amount of data, R would be the same as P.

We can't compute P exactly, but we can find $P_A$ such that we can reject the null hypothesis that $P \leq P_A$ with a confidence level of A, which might typically be 0.05. (In other words, there would only be a 5% chance that $P \leq P_A$.) Thus, $P_A$, as opposed to R, is a number that we can have a known degree of confidence in.

There are a number of different approaches for computing $P_A$. One of these uses the cumulative binomial distribution together with a search algorithm. In one embodiment, the search algorithm successively tests possible values for $P_A$ at certain fixed intervals, for instance, 0.01, 0.02, 0.03, . . . , 0.99 until it finds the greatest $P_A$ such that we can reject the null hypothesis that $P \leq P_A$ with confidence level A. In another embodiment, a binary search mechanism is used to accomplish the same goal more quickly and/or accurately. We'll refer to the chosen search algorithm as S( ). Let C( ) be the cumulative binomial probability distribution function. [One is described in Press, Teukolsky, Vetterling, and Flannery 1992, *Numerical Recipes in C, 2nd Ed.*, (Cambridge, England: The Cambridge University Press) p. 229; the relevant sections are hereby incorporated by reference.]

The inputs to C( ) will be:

1. An assumed value for P; these assumed values are generated by S( ) in order to see how consistent or inconsistent they are with the evidence.

2. The number of impressions of the ad (that is, the number of times people were shown the ad). From a statistical point of view, each impression is considered to be an experiment.

3. The number of clicks on the ad in question. From a statistical point of view, each click is considered to be a success in the experiment.

C( ) will calculate the probability that the presented combination of (2) and (3) (or a greater number of successes) could have occurred by chance alone given the assumption of (1). If this is a low probability, it's unlikely that the assumption is correct.

S( ) will repeatedly call C( ) with different trial values for P, until it finds one ($P_A$) such that the the calculated probability is A. If we have chosen a low A, then this would imply that we can confidently reject the hypothesis that $P \leq P_A$.

Then a relatively high value $P_A$ for a particular ad will mean that that is an ad we can be confident that Joe will be interested in. So $P_A$ can determine the order in which we present the ads; they are presented in reverse order of $P_A$.

Still another approach:

An approximate value could be found for $P_A$ by means of a neural network. (The neural network could be trained using $P_A$ as computed above.) This would have advantages over the previous approach in execution speed.

Alternatively, genetic programming could be used to evolve an algorithm that outputs an approximation to $P_A$.

The results of the previous two approaches could be computationally combined.

For instance, if the system orders the ads by using demographic data and also orders the ads using a "pure ACF" approach, such that the most appropriate ads for a given user come first, then the two approaches could easily be combined by calculating the average position for each ad. In other words, the ad might be the nth ad in the demographic-based ranking and the mth ad in the "pure ACF" ranking; the combined rank could be (n+m)/2.

There are an infinite number of other computational ways to combine the two techniques; very many of which could be constructed by any competent practicioner.

In combination with such approaches as are described in this section, cluster analysis can be used.

Instead of comparing Joe to each individual user, we can compare Joe to clusters of similar users. These clusters will be comprised of individuals with similar demographics and/or tracking histories. The degree of similarity between people will be computed as described above; in each cluster, each individual will be more similar to people in his own cluster than to people in other clusters.

Such an approach can be more computationally efficient, since Joe would only need to see which cluster he is associated with, rather than comparing himself to all (or a substantial subset) of the set of individual users.

Most ads will be more of interest to people in some clusters than others; this can be determined by techniques such as those described above, but applying those computations (such as the cumulative binomial distribution) to clusters rather than to individuals.

One other aspect of using ACF to decide which ads to show to which users should be noted here. The system has to collect data on a number of users which shows whether or not they responded to particular ads. Then, when, for instance, the system needs to compute the priority with which we should consider showing a particular ad to Joe, it finds users with similar profiles to Joe and who it has knowledge about whether or not they responded to the ad.

But this creates a chicken-or-egg situation; when an ad is new, there won't be any users who have already been exposed to the ad, so the system will be unable to find users who are similar to Joe and who it has prior knowledge about with respect to that ad.

So, for each new ad, there will have to be a period when ACF techniques are not the sole determinant of which ad is displayed; instead, such ads will be displayed either according to a fixed schedule or randomly. Moreover, a particular embodiment of this invention could also choose to continually have a probability that the ad shown a user at any given time might be randomly chosen rather than chosen by ACF. There is a tradeoff here:the more ads are randomly presented, a) the more data the system will be able to collect for the ACF engine, increasing the accuracy of the engine; and b) the more frequently users will be exposed to random ads that are not relevant to their interests.

The desired proportion of displaying ads according to the ACF output relative to displaying ads randomly or according to a fixed schedule can be determined by measuring such factors as overall system-wide number of responses to ads in a given period of time (which should ideally be high) and polling users on their satisfaction with the system. A mathematical analysis could also be used in predicting the best proportion. A simple and sensible starting point would be to simply assign 10% of viewing time to randomly chosen ads.

The various steps described hereinabove are desirably implemented by programming them into functions incorporated within Web Server software or in application programs used in conjunction with such software. Programmers of ordinary skill in the field can implement them using customary programming techniques in languages such as C, Visual Basic, Java, Perl, C++, and the like.

Having thus described the invention, what it is desired to claim and thereby protect by Letters Patent is:

1. An automated system in an interactive communication medium for selectively displaying one or more advertisements to a subject comprising:

a collaborative filtering means for determining a subject's community, using information derived from the activities of the subject in the interactive communication medium, and means for determining which of the one or more advertisements to show the subject based on characteristics of the subject's community, wherein the means for determining which of the one or more advertisements to show the subject based on characteristics of the subject's community includes means for displaying a new advertisement for a training period and means for determining whether a high or low proportion of members of the subject's community have viewed further information about the advertisement.

2. The system of claim 1, wherein the information derived from the activities of the subject comprises information selected from at least one of the following:

(1) an identity of one or more sites the subject has visited;
(2) a frequency with which the subject visits each of the one or more sites;
(3) a nature of the content at the visited sites;
(4) an identity of items purchased by the subject;
(5) a price of any items purchased by the subject;
(6) ratings supplied by the subject;
(7) a selection of advertisements the subject has chosen to view further information about; and
(8) a selection of advertisements in which the subject has indicated disinterest.

3. The system of claim 1, further comprising means for recording said information in a tracking database.

4. The system of claim 3, wherein said means for recording said information in a tracking database includes at least a portion of a computer program being executed by a processor which the subject used to visit the sites.

5. The system of claim 4, wherein the at least portion of a computer program being executed by the processor which the subject used to visit the sites is selected from at least one of the following: an in-line application with the ability to write directly to the subject's computer, a screensaver working in conjunction with a browser, and software incorporated in a browser.

6. The system of claim 1, wherein the means for determining which advertisements to show the subject based on characteristics of the subject's community includes means for associating a demographic profile with the community and means for associating a demographic profile with specific advertisements.

7. The system of claim 1, wherein the means for determining which advertisements to show the subject based on characteristics of the subject's community is embodied in software being executed by a processing system used by the subject.

8. A computer implemented process in an interactive medium for selectively displaying one or more advertisements to a subject comprising the steps of:

(a) tracking activities of the subject in the interactive medium;
(b) deriving information from the activities of the subject identified in said tracking step;
(c) determining a community of the subject using all or a portion of the information; and
(d) determining which of the one or more advertisements to present to the subject based on the subject's community, wherein said step of determining which advertisements to show the subject based on characteristics of the subject's community includes the steps of:
displaying a new advertisement for a training period; and
determining whether a high or low proportion of members of the subject's community have chosen to view further information about the advertisement.

9. The process of claim 8, wherein the information derived from the activities of the subject comprises information corresponding to at least one of:

(1) an identity of one or more sites the subject has visited;
(2) a frequency with which the subject visits each of the one or more sites;
(3) a nature of the information content at the visited sites;
(4) an identity of items purchased by the subject;
(5) a price of any items purchased by the subject;
(6) ratings supplied by the subject;
(7) a selection of advertisements the subject has chosen to view further information about; and
(8) a selection of advertisements in which the subject has indicated disinterest.

10. The process of claim 9, wherein the process further comprises the step of recording said information in a tracking database.

11. The process of claim 10, wherein said step of recording such information in a tracking database uses at least a portion of a computer program being executed by a processor which the subject used to visit the sites.

12. The process of claim 11, wherein the at least portion of a computer program being executed by the processor which the subject used to visit the sites is selected from at least one of the following: an in-line application with the ability to write directly to the subject's computer, a screen-saver working in conjunction with a browser, and software incorporated in a browser.

13. The process of claim 10, wherein the step of recording said information in a tracking database is under Common Gateway Interface control.

14. The process of claim 8, wherein said step of determining which advertisements to show the subject based on the subject's community includes the steps of:

associating a demographic profile with the community; and associating a demographic profile with specific advertisements.

15. The process of claim 8, further comprising the step of filtering the information from said deriving step to provide filtered information.

16. The process of claim 15, further comprising the step of grouping the subject into a cluster formed of other subjects with similar communities.

17. A computer program product for selectively displaying at least one or more host based advertisements to a guest at a remote location comprising:

(a) a computer usable medium having computer readable program code means embodied therein for tracking activities of the guest at the remote location;

(b) computer readable program code means for deriving information from the activities of the guest identified in said tracking step;

(c) computer readable program code means for determining a community of the guest using all or a portion of the information; and (d) computer readable program code means for determining which advertisements to present to the guest based on the guest's community, wherein the means for determining which advertisements to present the subject based on the guest's community includes computer readable program code means for displaying a new advertisement for a training period and computer readable program code means for determining whether a high or low proportion of members of the guest's community have chosen to view further information about the advertisement.

18. The computer program product of claim 17, wherein the information derived from the activities of the guest comprises information selected from at least one of the following:

(1) an identity of one or more sites the guest has visited;

(2) a frequency with which the guest visits each of the one or more sites;

(3) a nature of the content at the visited sites;

(4) an identity of items purchased by the guest;

(5) a price of any items purchased by the guest;

(6) ratings supplied by the guest;

(7) a selection of advertisements the guest has chosen to view further information about; and (8) a selection of advertisements in which the guest has indicated disinterest.

19. The computer program product of claim 17, wherein the product further comprises computer readable program code means for recording the information in a tracking database stored locally at the guest's remote location.

20. The computer program product of claim 17, further comprising readable program code means for filtering the information from said deriving step to provide filtered information.

21. The computer program product of claim 17, wherein a plurality of guests with similar communities are grouped into clusters.

22. The computer program product of claim 17, wherein a demographic profile is created for the guest based upon the information derived from the activities of the guest.

23. A computer program product for selectively displaying at least one or more host based advertisements to a guest at a remote location comprising:

(a) a computer usable medium having computer readable program code means embodied therein for tracking activities of the guest at the remote location;

(b) computer readable program code means for deriving information from the activities of the guest identified in said tracking step;

(c) computer readable program code means for determining a community of the guest using all or a portion of the information;

(d) computer readable program code means for determining which advertisements to present to the guest based on the guest's community; and (e) computer readable program code means for displaying an advertisement, the computer readable program code means for displaying an advertisement responsive to the computer readable program code means for determining which advertisements to present the guest wherein the computer readable program code means for displaying displays the advertisement determined by the computer readable program code means for determining which advertisement to present the guest wherein the guest has the ability to reject the selected advertisement, whereby the rejected advertisement is replaced with a second selected advertisement determined by said computer readable program code means for determining which advertisement to present the guest.

24. The computer program product of claim 23, wherein the computer readable program code means for displaying displays the advertisements in a window of a display at the guest's remote location.

25. The computer program product of claim 24, wherein the advertisement displayed in the window is linked to an advertiser's site.

* * * * *